United States Patent
Baldwin, III et al.

(10) Patent No.: US 7,470,195 B1
(45) Date of Patent: Dec. 30, 2008

(54) CAMERA CONTROL FOR THIRD-PERSON CONSOLE VIDEO GAME

(75) Inventors: William A. Baldwin, III, Austin, TX (US); Tim V. Fields, Austin, TX (US); Erin D. Roberts, Austin, TX (US); James R. J. York, Austin, TX (US)

(73) Assignee: Microsoft Corporation, Redmond, WA (US)

( * ) Notice: Subject to any disclaimer, the term of this patent is extended or adjusted under 35 U.S.C. 154(b) by 668 days.

(21) Appl. No.: 10/352,672

(22) Filed: Jan. 28, 2003

(51) Int. Cl.
*A63F 9/24* (2006.01)

(52) U.S. Cl. ...................................... 463/33
(58) Field of Classification Search ............... 463/31, 463/32, 33, 30, 44
See application file for complete search history.

(56) References Cited

U.S. PATENT DOCUMENTS

| | | | |
|---|---|---|---|
| 6,155,926 A * | 12/2000 | Miyamoto et al. | 463/32 |
| 6,468,160 B2 | 10/2002 | Eliott | |
| 6,712,704 B2 | 3/2004 | Eliott | |
| 6,769,989 B2 | 8/2004 | Smith et al. | |
| 2004/0162137 A1 | 8/2004 | Eliott | |

OTHER PUBLICATIONS

Fielder, Joe. GameSpot editors' review for Tomorrow Never Dies (PlayStation). [online] [retrieved Apr. 11, 2006] Retrieved from CNET <URL:http://www.cnet.com/>. Attaching print out (6 pages).*
The Legend of Zelda, Ocarina of Time for Nintendo 64: Instruction Manual. Released Nov. 23, 1998. Scanned Copy. [online] [retrieved on Apr. 11, 2006] Retrieved from The Game Manual Archive <URL: http://www.gamemanuals.net/>. Attaching print out (22 pages).*
IGN: Syphon Filter—Reviews, Screenshots, Videos & More. [online] [retrieved Apr. 11, 2006] <URL:http://psx.ign.com/objects/010/010574.html>. Attaching print out (4 pages).*
Secret of Mana, Square Company Ltd., 1993.*
Electronic Arts Inc. EA Sports Madden 2002, Copyright 2001.*
Fielder, Joe. GameSpot editor's review for Tomorrow Never dies (Playstation). [online] [retrieved Apr. 11, 2006] Retrieved from CNET <URL:http://www.cnet.com/>.*
MobyGames, Contra Screenshots. [online[ [retrieved Dec. 20, 2007] Retrieved from MobyGames <URL:http://www.mobygames.com/game/contra/screenshots.*

* cited by examiner

*Primary Examiner*—Robert E. Pezzuto
*Assistant Examiner*—Omkar Deodhar
(74) *Attorney, Agent, or Firm*—Lee & Hayes, PLLC (57) ABSTRACT

In a third-person shooter video game, the viewing perspective is smoothly transitioned between an "explorer" viewpoint and a "ready" viewpoint as game conditions change. In the "explore" viewpoint, scenes are depicted from a camera positioned behind and removed from a character. The explorer viewpoint offers a wide angle of view of the surrounding combat area, enabling the game player to scout the terrain. In the "ready" viewpoint, scenes are depicted from the camera as it is repositioned close to the character. The ready viewpoint provides a narrower angle of view to facilitate better aiming when the character is engaged in armed combat. The transition between the explorerr and ready viewpoints tracks a non-linear path.

21 Claims, 7 Drawing Sheets

Fig. 7

CAMERA CONTROL FOR THIRD-PERSON CONSOLE VIDEO GAME

TECHNICAL FIELD

This invention relates to video games for console-based gaming systems, and more particularly, to camera control features of a third-person shooter video game.

BACKGROUND

One genre of video games is known as "shooter" games, in which players engage in forms of combat using various weapons. Within the shooter genre, the game may be developed in a first-person context, in which the player views scenes through the eyes of the shooter. Alternatively, the game may be architected in a third-person context, where the player views the scenes from a camera viewpoint removed from each character.

One problem that can arise in third-person shooter games is that a player feels a little more detached from the action in comparison to first-person shooter games. In a first-person shooter game, the player operates as the shooter character and sees the terrain and combat situations through the character's eyes. In the third-person context, however, the player is removed from the shooter, watching the action from a remote camera perspective which lends to a feeling of being less engaged in the action. This detached feeling is made worse when the player maneuvers through various terrains and obstacles temporarily come between the camera viewpoint and the character to obscure the player's vision of the character.

Accordingly, there is a need for an improved user experience in a third-person shooter game.

SUMMARY

A technique for controlling camera viewpoints in a third-person shooter video game is described. Scenes are depicted from a camera positioned behind and removed from a character that is being controlled by a player. As conditions change during the game, the camera is moved smoothly along a non-linear path between an "explorer" viewpoint and a "ready" viewpoint. In the "explorer" viewpoint, the camera is farther removed from the character to provide a wider angle of view of the battle terrain as the character moves about. In the "ready" viewpoint, the camera resides just behind the character to facilitate better aiming when the character is engaged in combat. Selection of a camera viewpoint and timely movement between the two viewpoints are controlled to facilitate a more intimate feel with the character and to avoid having obstacles obscure vision of the character and/or reticle used to sight targets.

BRIEF DESCRIPTION OF THE DRAWINGS

The same numbers are used throughout the disclosure and figures to reference like components and features.

DETAILED DESCRIPTION

The following disclosure described a camera control technique for a third-person shooter video game. For discussion purposes, the camera control technique is described in the context of a squad-based shooter video game for a console-based gaming system. In particular, exemplary screen shots showing various camera positions are taken from the video game title, *Brute Force*, which is developed for Microsoft's Xbox® gaming system. With squad-based games, a player controls a squad of characters, rather than just a single character. The player can give orders to one or more characters of the squad, and the characters carry out the order without direct intervention from the player. The gaming system will be described first, followed by a discussion of the camera control technique.

Gaming System

Figure 1:
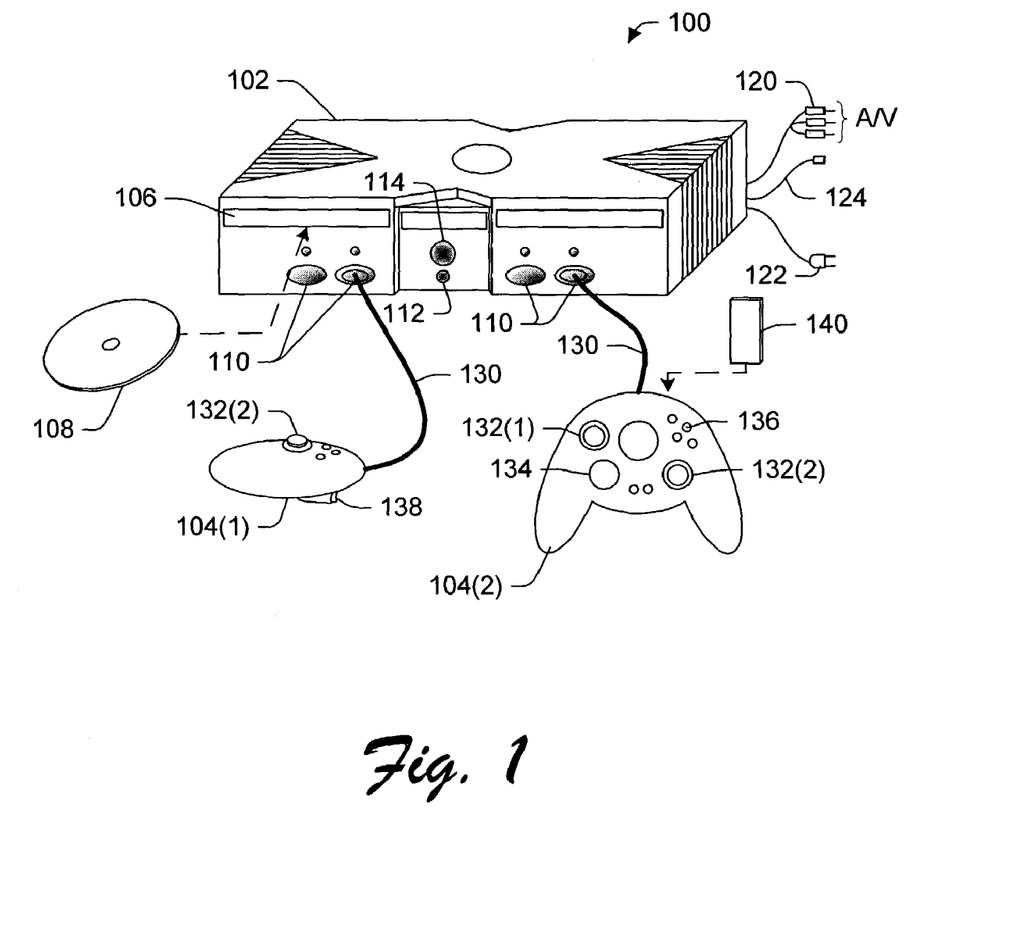
FIG. 1 illustrates a gaming system with a game console and one or more controllers.

FIG. 1 shows an exemplary gaming system 100. It includes a game console 102 and up to four controllers, as represented by controllers 104(1) and 104(2). The game console 102 is equipped with an internal hard disk drive and a portable media drive 106. The portable media drive 106 supports various forms of portable storage media as represented by optical storage disc 108. Examples of suitable portable storage media include DVD, CD-ROM, game discs, game cartridges, and so forth.

The game console 102 has four slots 110 on its front face to support up to four controllers, although the number and arrangement of slots may be modified. A power button 112 and an eject button 114 are also positioned on the front face of the game console 102. The power button 112 switches power to the game console and the eject button 114 alternatively opens and closes a tray of the portable media drive 106 to allow insertion and extraction of the storage disc 108.

The game console 102 connects to a television or other display (not shown) via A/V interfacing cables 120. A power cable 122 provides power to the game console. The game console 102 may further be equipped with internal or externally added network capabilities, as represented by the cable or modem connector 124 to facilitate access to a network, such as a local area network (LAN) or the Internet.

Each controller 104 is coupled to the game console 102 via a wire or wireless interface. In the illustrated implementation, the controllers are USB (Universal Serial Bus) compatible and are connected to the console 102 via serial cables 130. The controller 102 may be equipped with any of a wide variety of user interaction mechanisms. As illustrated in FIG. 1, each controller 104 is equipped with two thumbsticks 132(1) and 132(2), a directional or D-pad 134, surface buttons 136, and two triggers 138. These mechanisms are merely representative, and other known gaming mechanisms may be substituted for or added to those shown in FIG. 1.

A memory unit (MU) 140 may be inserted into the controller 104 to provide additional and portable storage. Portable memory units enable users to store game parameters and transport them for play on other consoles. In the described implementation, each controller is configured to accommodate two memory units 140, although more or less than two units may be employed in other implementations.

The gaming system 100 is capable of playing, for example, games, music, and videos. With the different storage offerings, titles can be played from the hard disk drive or the portable medium 108 in drive 106, from an online source, or from a memory unit 140. A sample of what the gaming system 100 is capable of playing back includes:

1. Game titles played from CD and DVD discs, from the hard disk drive, or from an online source.
2. Digital music played from a CD in the portable media drive 106, from a compressed file on the had disk drive (e.g., Windows Media Audio (WMA) format), or from online streaming sources.
3. Digital audio/video played from a DVD disc in the portable media drive 106, from a file on the hard disk drive (e.g., Windows Media Video (WMV) format), or from online streaming sources.

Figure 2:
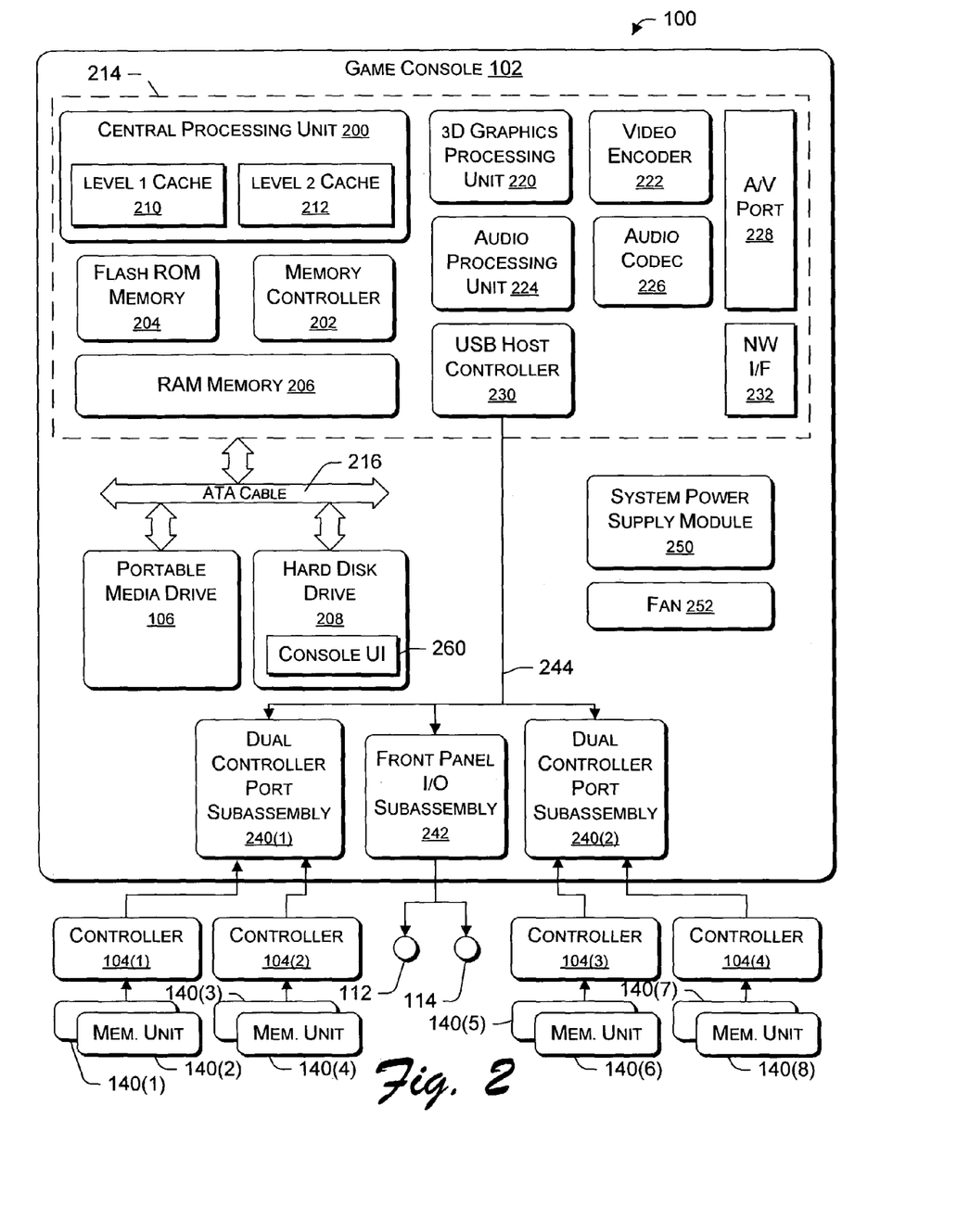
FIG. 2 is a block diagram of the gaming system that is capable of supporting a third-person shooter video game.

FIG. 2 shows functional components of the gaming system 100 in more detail. The game console 102 has a central processing unit (CPU) 200 and a memory controller 202 that facilitates processor access to various types of memory, including a flash ROM (Read Only Memory) 204, a RAM (Random Access Memory) 206, a hard disk drive 208, and the portable media drive 106. The CPU 200 is equipped with a level 1 cache 210 and a level 2 cache 212 to temporarily store data and hence reduce the number of memory access cycles, thereby improving processing speed and throughput.

The CPU 200, memory controller 202, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

As one suitable implementation, the CPU 200, memory controller 202, ROM 204, and RAM 206 are integrated onto a common module 214. In this implementation, ROM 204 is configured as a flash ROM that is connected to the memory controller 202 via a PCI (Peripheral Component Interconnect) bus and a ROM bus (neither of which are shown). RAM 206 is configured as multiple DDR SDRAM (Double Data Rate Synchronous Dynamic RAM) modules that are independently controlled by the memory controller 202 via separate buses (not shown). The hard disk drive 208 and portable media drive 106 are connected to the memory controller via the PCI bus and an ATA (AT Attachment) bus 216.

A 3D graphics processing unit 220 and a video encoder 222 form a video processing pipeline for high speed and high resolution graphics processing. Data is carried from the graphics processing unit 220 to the video encoder 222 via a digital video bus (not shown). An audio processing unit 224 and an audio codec (coder/decoder) 226 form a corresponding audio processing pipeline with high fidelity and stereo processing. Audio data is carried between the audio processing unit 224 and the audio codec 226 via a communication link (not shown). The video and audio processing pipelines output data to an A/V (audio/video) port 228 for transmission to the television or other display. In the illustrated implementation, the video and audio processing components 220-228 are mounted on the module 214.

Also implemented on the module 214 are a USB host controller 230 and a network interface 232. The USB host controller 230 is coupled to the CPU 200 and the memory controller 202 via a bus (e.g., PCI bus) and serves as host for the peripheral controllers 104(1)-104(4). The network interface 232 provides access to a network (e.g., LAN, Internet, etc.) and may be any of a wide variety of various wired or wireless interface components including an Ethernet card, a modem, a Bluetooth module, a cable modem, and the like.

The game console 102 has two dual controller support subassemblies 240(1) and 240(2), with each subassembly supporting two game controllers 104(1)-104(4). A front panel I/O subassembly 242 supports the functionality of the power button 112 and the eject button 114, as well as any LEDs (light emitting diodes) or other indicators exposed on the outer surface of the game console. The subassemblies 240(1), 240(2), and 242 are coupled to the module 214 via one or more cable assemblies 244.

Eight memory units 140(1)-140(8) are illustrated as being connectable to the four controllers 104(1)-104(4), i.e., two memory units for each controller. Each memory unit 140 offers additional storage on which games, game parameters, and other data may be stored. When inserted into a controller, the memory unit 140 can be accessed by the memory controller 202.

A system power supply module 250 provides power to the components of the gaming system 100. A fan 252 cools the circuitry whiting the game console 102.

A console user interface (UI) application 260 is stored on the hard disk drive 208. When the game console is powered on, various portions of the console application 260 are loaded into RAM 206 and/or caches 210, 212 and executed on the CPU 200. The console application 260 presents a graphical user interface that provides a consistent user experience when navigating to different media types available on the game console.

The game console 102 implements a cryptography engine to perform common cryptographic functions, such as encryption, decryption, authentication, digital signing, hashing, and the like. The cryptography engine may be implemented as part of the CPU 200, or in software stored in memory (e.g., ROM 204, hard disk drive 208) that executes on the CPU, so that the CPU is configured to perform the cryptographic functions.

The gaming system 100 may be operated as a standalone system by simply connecting the system to a television or other display. In this standalone mode, the gaming system 100 allows one or more players to play games, watch movies, or listen to music. However, with the integration of network connectivity made available through the network interface 232, the gaming system 100 may further be operated as a participant in a larger network gaming community.

Video games may be stored on various storage media for play on the game console. For instance, a video game may be stored on the portable storage disc 108, which is read by drive 106. Alternatively, the video game may be stored in hard disk drive 208, being transferred from a portable storage medium or downloaded from a network. During play, portions of the game are temporarily loaded into RAM memory 206, caches 210 and 212, and executed by the CPU 200. One particular vied game of the shooter genre is described next to help explain camera control techniques used in third-person video games.

Camera Control

In a third-person shooter video game, scenes are depicted from a perspective removed from the character being controlled. The scenes are created as if taken from a camera viewpoint reading behind the character.

Figure 3:
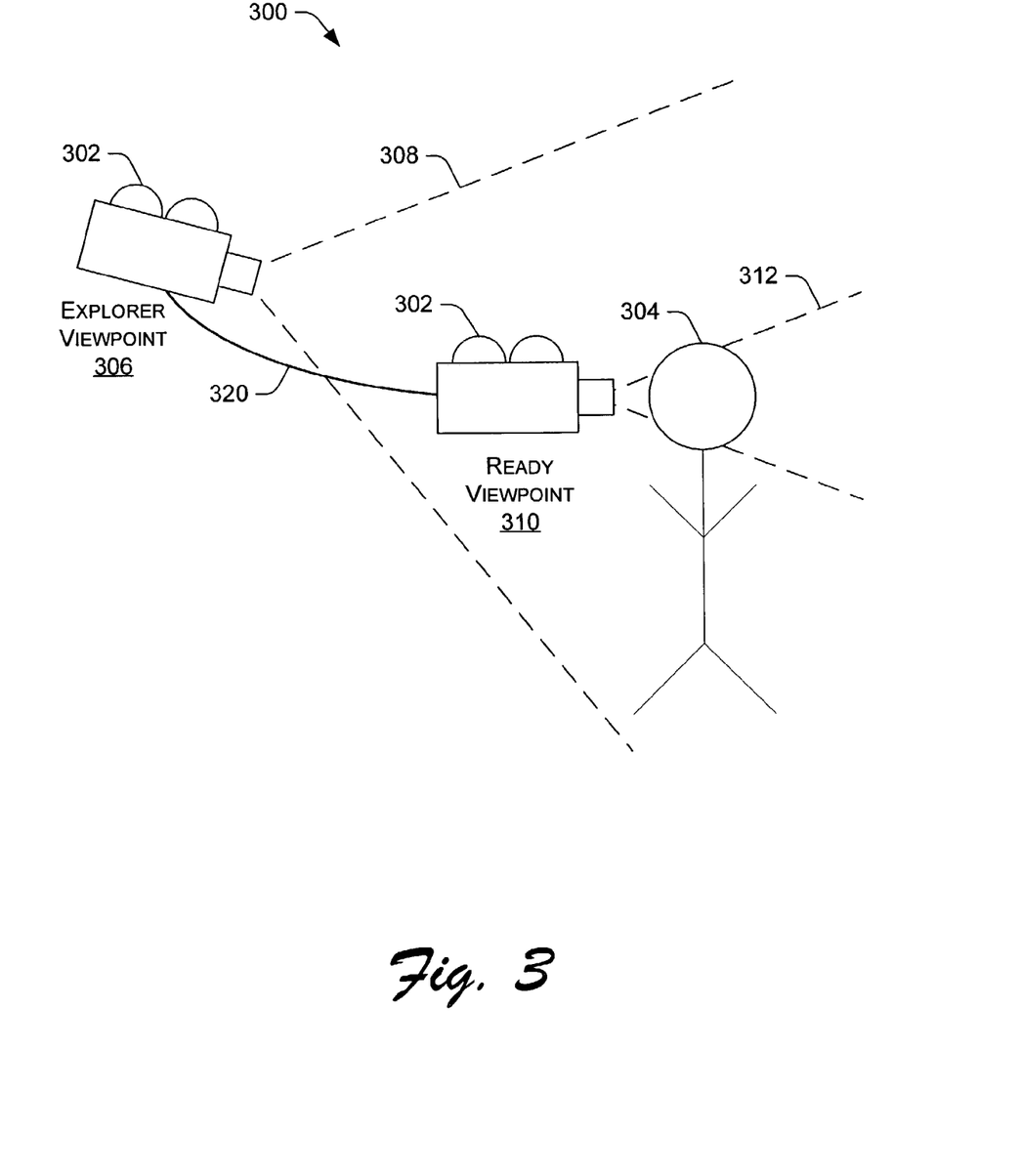
FIG. 3 illustrates a two camera viewpoint—an explorer viewpoint and a ready viewpoint—employed in the third-person shooter video game.

FIG. 3 illustrates a third-person camera control technique 300 for a video game. The camera control technique 300 controls movement of a camera perspective, represented by camera 302, between two different viewpoints taken from behind a controlled character 304. A first camera viewpoint 306 positions the camera 302 farthest from the character 304. This viewpoint is referred to as the "explorer" viewpoint, as the camera follows the character through the action from a predefined distance that enables the player to scout the terrain. The explorer viewpoint 306 provides a wide angle of view 308 that allows the player to see more of the surrounding area as the character moves about.

A second camera viewpoint 310 positions the camera 302 closet to the character 304. This viewpoint is referred to as the "ready" viewpoint, as the camera is positioned to facilitate better aiming when the character shoots at a target. The ready viewpoint 310 provides a narrower angle of view 312 as the player focuses on the target.

The camera 302 is moved along a non-linear arc 320 between the two viewpoints 306 and 310. The arc 320 facilitates a smooth and natural viewing perspective as the camera transitions from the hovering explorer viewpoint 306 to the close-up ready viewpoint 310. Selection of the appropriate viewpoint is governed by certain events that occur during game play. In one implementation, the explorer viewpoint 306 is the default camera position. Then, upon occurrence of certain predefined events, the camera is moved to the ready viewpoint 310 along arc 320. The predefined events are associated with readying the character for combat. These events are described below in more detail. The camera remains in the ready viewpoint as long as one of the events occurs. When no predefined event is present, the camera transitions back along arc 320 to the explorer viewpoint 306 after a predefined delay period.

Figure 4:
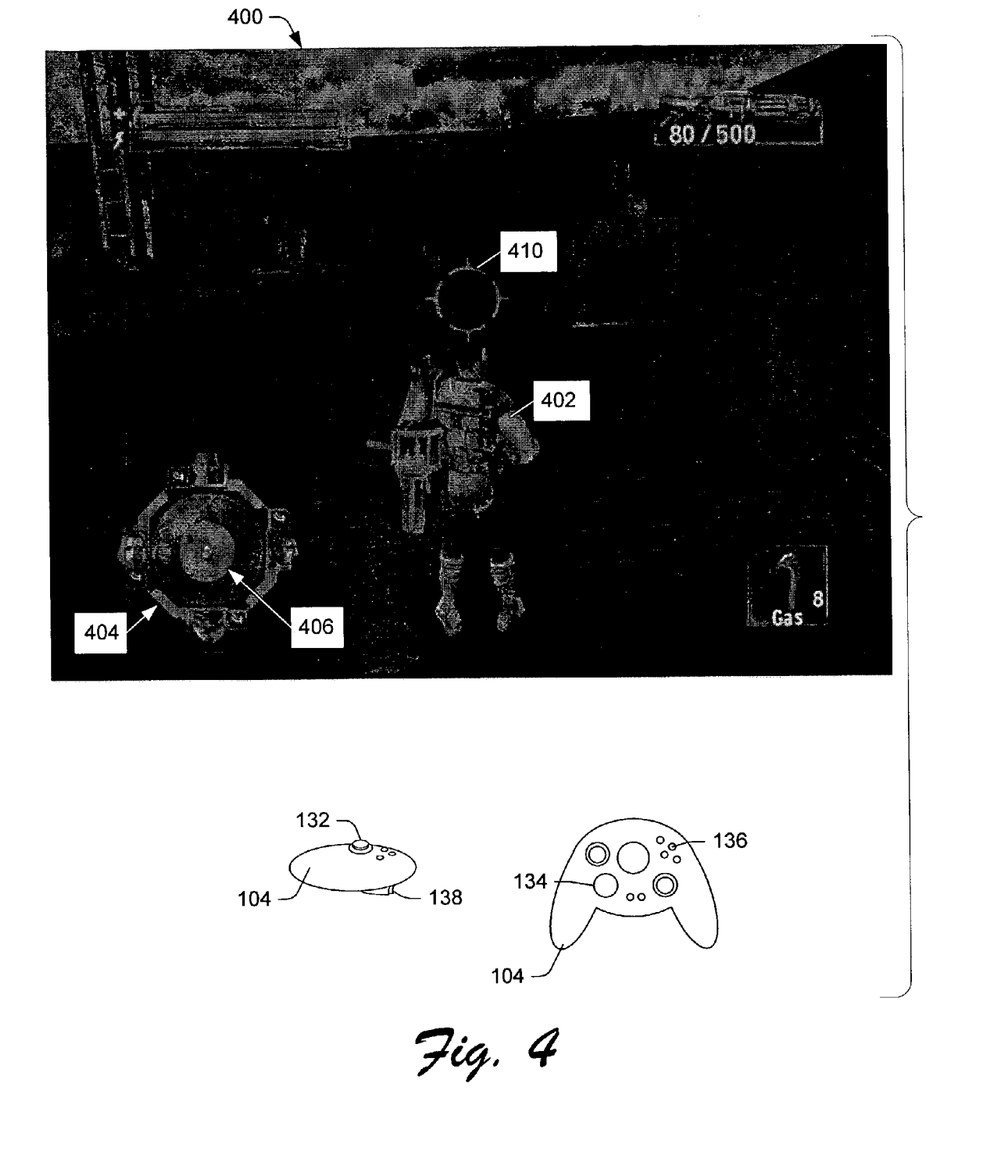
FIG. 4 shows an exemplary scene of the third-person shooter video game, taken from the explorer viewpoint.

FIG. 4 shows an exemplary scene 400 from the squad-based shooter video game title, *Brute Force*, when the camera is in the explorer viewpoint. In scene 400, the "Tex" character 402 from the squad is illustrated in a combat scene. The Tex character 402 is currently the character being directly controlled by the player. The other characters from the squad are not shown in this scene, but a squad status display 404 and a radar display 406 keeps the player informed as to the other characters location and current assignment. For the selected character (e.g., Tex), the player controls where that character moves, what that character sees, and how that character acts. Additionally, the player can issue commands to one or more other characters on the squad, such as where to move and how to function in combat. Artificial intelligence built into the video game controls the other non-selected characters of the squad to perform functions consistent with the commands instructed by the player. The characters' current commands are depicted on the squad status display 404.

In the explorer viewpoint, the camera is positioned behind the selected character, as represented by the rearward hovering viewing perspective taken from behind the Tex character 402 in FIG. 4. This camera viewpoint offers a relatively wide angle of view to see more of the surrounding area. From the explorer viewpoint, the camera is pivotal so that the player can look around the scene by actuating the thumbstick 132, or other actuator, on the controller 104. This ability to see more of the combat area and pivot around for wide area viewing enables the player to better grasp the current landscape and combat scenario and thereby develop a more informed strategy for attack.

At the center of the screen is a reticle 410, which is a grid or pattern that one would see when sighting a target through an eyepiece of a weapon scope. Unlike conventional shooter games, where the player moves the reticle around the screen at various targets, the reticle 410 in the *Brute Force* shooter game remains stationary. The player maneuvers the controlled character in order to position the stationary reticle on a desired target. With the camera behind the character in the explorer viewpoint, there is the possibility of obstacles interfering with a line-of-sight of the character. Additionally, in some situations, the character might get in the way of the reticle 410 and hence the target at which the player is aiming.

To minimize line-of-sight obstructions, the camera position is controlled to move from the explorer viewpoint to the ready viewpoint when certain predefined events occur. One example event is when the player partially squeezes the trigger 138 on the controller 104. Such action causes the character to ready its weapon, while the camera moves to the ready viewpoint in order to facilitate better aiming and shooting. Another event is when the reticle 410 is positioned over an enemy.

A third event that triggers transition to the ready viewpoint is when the player moves into a certain region on the combat map. That is, the game developer may preset certain regions that force the camera perspective to the ready viewpoint. For example, suppose the character enters a forest. In such an environment, the camera might otherwise being constantly moving in and out between viewpoints to avoid trees or other obstacles from obstructing the player's vision of the character. By forcing the camera to the ready viewpoint, the annoying in-and-out bouncing is eliminated.

Figure 5:
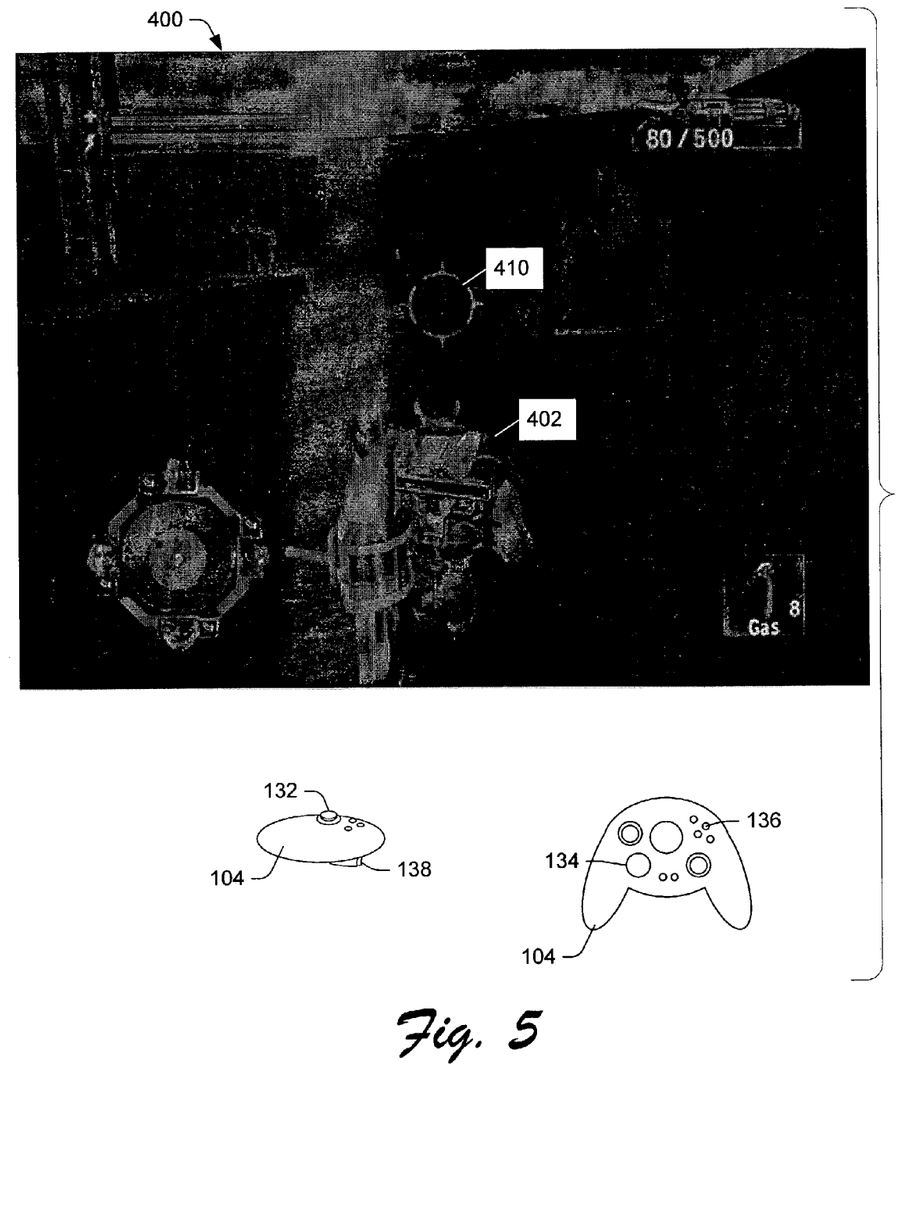
FIG. 5 shows the same scene as FIG. 4, but with the camera moved to the ready viewpoint.

FIG. 5 shows the same scene 400, but with the camera is in the ready viewpoint. The camera is moved much closer to the controlled Tex character 402 and the angle of view is narrowed. From this viewpoint, the player is better able to aim at targets through the reticle 410. The player positions the character to place the reticle 410 over intended targets, and then fires at the target by squeezing trigger 138 on controller 104.

The camera remains in the ready viewpoint as long as any one of the conditions is met (e.g., player is actuating trigger 138, character is located in specified region, or reticle is positioned over an enemy). When these conditions are no loner met for a predefined period of time, the camera transitions back to the explorer viewpoint of FIG. 4.

It may be possible for the character to partially or completely obscure the player's vision of the reticle 410 in either the explorer or ready viewpoints. In this situation, the character becomes translucent so that the player can see through the character to view the reticle 410 and underlying target.

Transitioning Between Viewpoints

Figure 6:
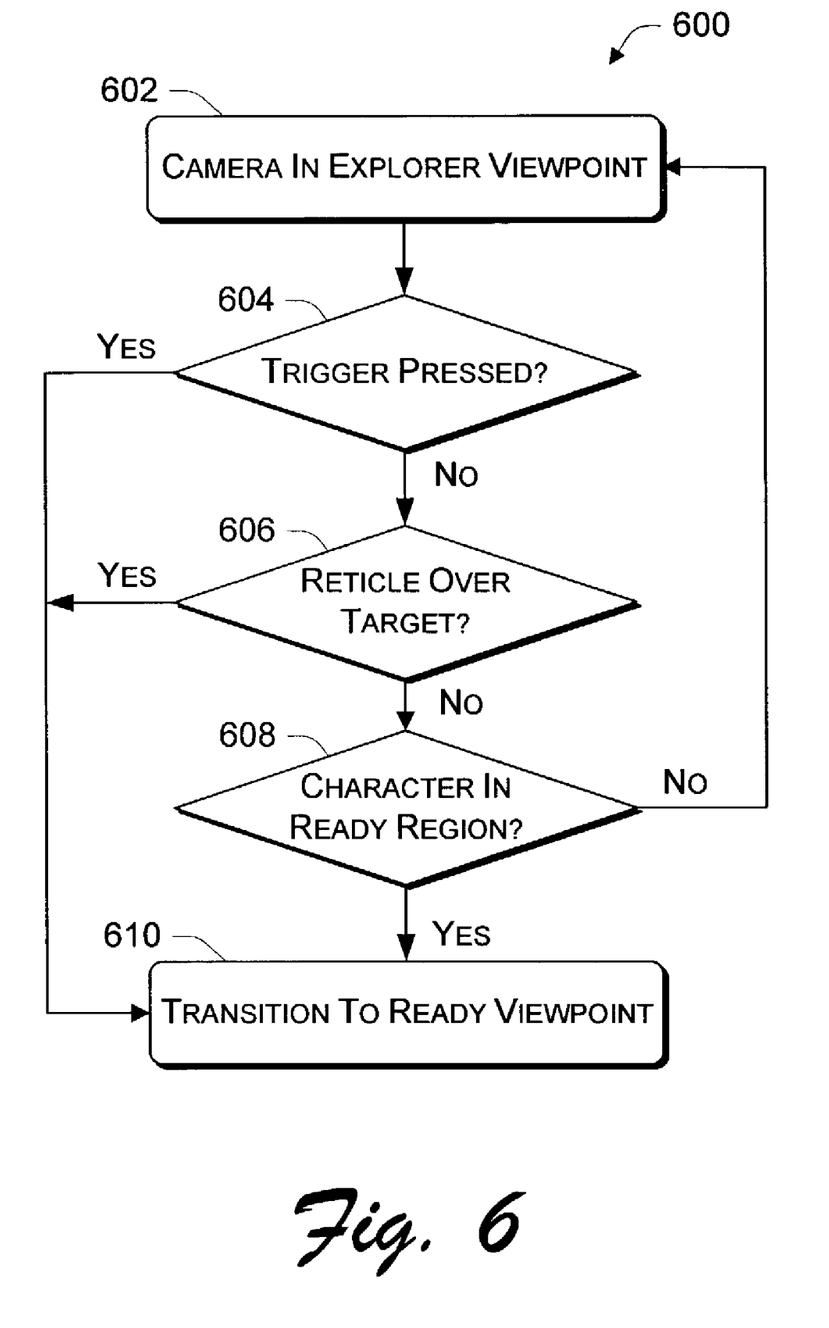
FIG. 6 shows an exemplary process for determining when to transition from the explorer viewpoint to the ready viewpoint.
Figure 7:
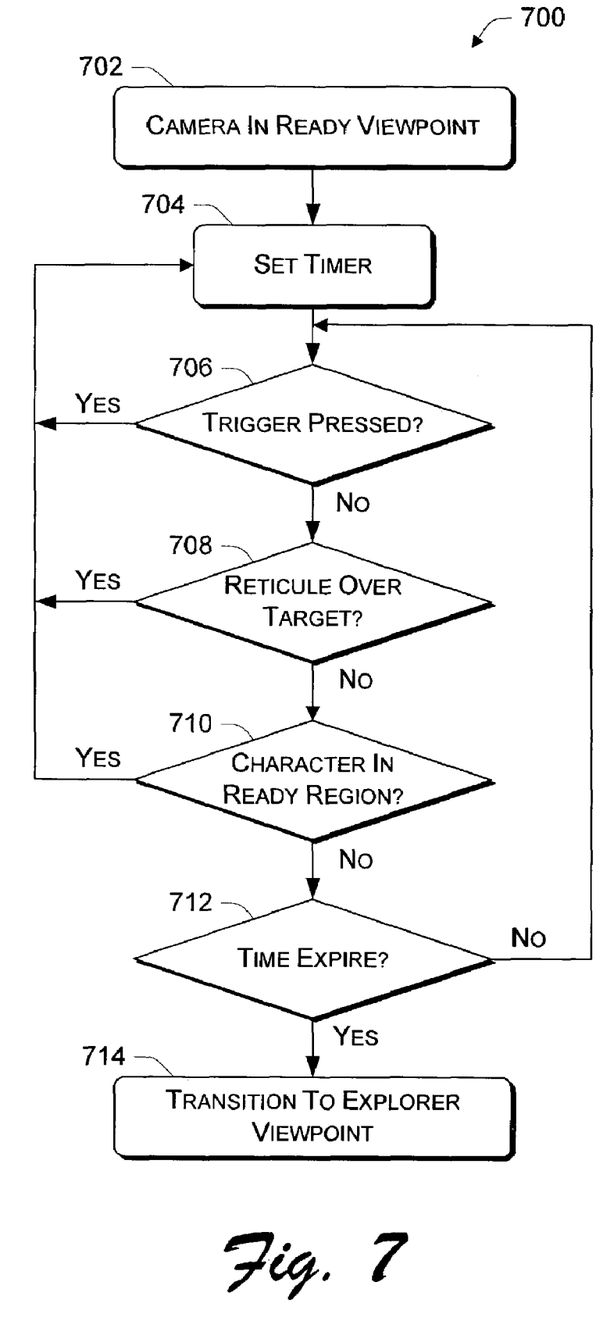
FIG. 7 shows an exemplary process for determining when to transition from the ready viewpoint to the explorer viewpoint.

FIGS. 6 and 7 show one exemplary procedure for transitioning the camera between the explorer viewpoint and the ready viewpoint. When the camera is in the explorer viewpoint, the gaming system continually evaluates whether certain conditions dictate movement of the camera to the ready viewpoint. When the camera is in the ready viewpoint, the gaming system continually evaluates whether the conditions are still being met within a prescribed timeout period.

The processes for transitioning between these viewpoints are described separately below. The processes are illustrated as a series of blocks that represent individual operations or acts performed by the gaming system in response to executing the video game. The processes may be implemented in any suitable hardware, software, firmware, or combination thereof. In the case of software and firmware, processes represent sets of operations implemented as computer-executable instructions stored in memory and executable by one or more processors.

Explorer-to-Ready Transition

FIG. 6 shows a process 600 for determining when to transition from the explorer viewpoint to the ready viewpoint. At block 602, the camera is initially positioned at the explorer viewpoint. With the camera in this state, the gaming system evaluates several conditions to decide whether to move the camera to the ready viewpoint. Three representative conditions are examined at blocks 604, 606, and 608. More or fewer conditions may be employed.

At block 604, the gaming system determines whether the player has squeezed the trigger 138. This affirmative action suggests that the player has a desire to shoot at a target, or at least be ready to shoot. If this event does not occur (i.e., the "No" branch from block 604), the gaming system determines whether the reticle is positioned over a target (block 606). By positioning the reticle over a target, the gaming system anticipates the player's desire to shoot at the target. If neither the first nor the second condition is present (i.e., the "No" branch from block 606), the gaming system determines whether the controlled character has moved to a specified region of the combat map that is associated with the ready viewpoint (block 608). If one of the conditions is met (i.e., the "No" branch from block 608), the camera remains at the explorer viewpoint (block 602).

Conversely, if anyone of the conditions is met, such as the trigger is actuated (i.e, the "Yes" branch from block 604) or the reticle is positioned over a target (i.e., the "Yes" branch from block 606) or the character is in a specified ready region (i.e., the "Yest" branch from lock 608), the camera is transitioned smoothly along the non-linear path to the ready viewpoint (block 610).

Ready-to-Explorer Transition

FIG. 7 shows a process 700 for determining when to transition from the ready viewpoint to the explorer viewpoint. At block 702, the camera is currently positioned at the ready viewpoint. At block 704, the gaming system sets a timer for a programmable delay period (e.g., 20 seconds). With the camera in the ready state, the gaming system evaluates whether any of the conditions to keep the camera in the ready viewpoint are still valid. The same three representative conditions are examined at blocks 706, 708, and 710. As before, more or fewer conditions may be employed.

At block 706, the gaming system determines whether the player continues to press the trigger 138. If this event does not occur (i.e., the "No" branch from block 706), the gaming system determines whether the reticle is positioned over a target (block 708). If neither the first nor second condition is present (i.e., the "No" branch from block 708), the gaming system determines whether the controlled character has moved to a pre-specified region of the combat map that is associated with the ready viewpoint (block 710). If no conditions are met (i.e., the "No" branch from block 710), the gaming system determines whether the delay period has expired (block 712). If not (i.e., the "No" branch from block 712), the gaming system continues to evaluate the conditions. Conversely, if anyone of the conditions is met before the time delay expires, the camera remains positioned at the ready viewpoint and the timer is reset.

When no conditions are met and the delay period expires (i.e., the "Yes" branch from block 712), the camera is transitioned smoothly back along the non-linear path to the explorer viewpoint (block 714).

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. In a third-person shooter video game, a method comprising:
    presenting a scene from a first camera viewpoint remote from a character being controlled, wherein the character being controlled is one of a squad of characters participating in the game and individually selectable for control, and wherein at least one of the squad of characters not being directly controlled by a player performs one or more player-issued commands by way of an artificial intelligence of the video game, wherein the one or more player-issued commands are determined from a range of possible player-issued commands, and wherein one or more player-issued commands are depicted on a squad status display;
    in response to occurrence of a predefined event, smoothly transitioning to present the scene from a second camera viewpoint closer to the character being controlled; and
    smoothly transitioning back to the first camera viewpoint after i) the predefined event ceases to exist and ii) a predefined time delay lapses,
    wherein the predefined event comprises:
        (i) player-actuation of a controller that directs the character to fire a weapon;
        (ii) placement of an aiming reticle over a target; or
        (iii) movement of the character into a specified combat region.

2. A method as recited in claim 1, wherein the predefined event relates to the character being placed in a combat ready state.

3. A method as recited in claim 1, further comprising presenting the scene from the first camera viewpoint with a first angle of view and presenting the scene from the second camera viewpoint with a second angle of view different than the first angle of view.

4. A method as recited in claim 3, wherein the first angle of view is wider than the second angle of view.

5. A method as recited in claim 1, further comprising:
    depicting a reticle to assist in aiming at a target; and
    causing the character to become translucent when the character at least partially overlaps the reticle.

6. A method, comprising:
    monitoring for conditions that might arise during play of a third-person shooter video game; and
    based on the conditions, moving a viewing perspective of scenes in the video game between an explorer viewpoint that shows the scenes from a third-person perspective taken behind and remote from a character being controlled and a ready viewpoint that shows the scenes from a third-person perspective taken from behind, but close to, the character, wherein the character being controlled is one of a squad of characters selectable for control, and wherein at least one other character of the squad of characters not being directly controlled by a player performs at least one player-issued command by way of an artificial intelligence of the video game, wherein the at least one player-issued command is determined from a range of possible player-issued commands;
    depicting one or more player-issued commands on a squad status display; and
    depicting a reticle to assist in aiming at a target, the reticle remaining stationary such that the character being controlled moves relative to the reticle in order to position the reticle on a desired target, wherein the explorer viewpoint is a default, and the viewing perspective is moved to the ready viewpoint in response to at least one of the following conditions:
player-actuation of a controller that is indicative of shooting;
placement of an aiming reticle over a target; or
movement of the character into a specified combat region.

7. A method as recited in claim 6, wherein the viewing perspective transitions between the explorer viewpoint and the ready viewpoint along a non-linear path.

8. A method as recited in claim 6, wherein the scenes are depicted at the explorer viewpoint as if taken through a first angle of view and the scenes are depicted at the ready viewpoint as if taken through a second angle of view different than the first angle of view.

9. A method as recited in claim 8, wherein the first angle of view is wider than the second angle of view.

10. A method as recited in claim 9, wherein the viewing perspective is returned from the ready viewpoint to the explorer viewpoint when none of the conditions arises for a specified time period.

11. A method as recited in claim 6, further comprising:
causing the character to become translucent when the character at least partially blocks the reticle.

12. A video game of a third-person shooter genre, comprising computer executable instructions that, when executed by a processor, perform acts comprising:
displaying scenes from a third-person perspective relative to a character being controlled of the video game, the character being controlled being one of squad or user-controllable characters simultaneously participating in the video game, wherein at least one other character of the squad of characters performs one or more user-issued commands by way of an artificial intelligence of the video game, and wherein the third-person perspective including an explorer viewpoint remote from the character that trails the character as the character moves around and a ready viewpoint close to the character and wherein the one or more user-issued commands are depicted on a squad status display; and
moving between the explorer viewpoint and the ready viewpoint as events change in the video game, wherein the moving comprises changing from the ready viewpoint to the explorer viewpoint after a predefined event ceases to exist and a specified time delay lapses,
wherein the moving comprises changing from the explorer viewpoint to the ready viewpoint if any one of the following events occurs:
sensing player-actuation of a controller that is indicative of shooting;
placement of an aiming reticle over a target; or
positioning of the character in a pre-specified combat region.

13. A video game as recited in claim 12, wherein the moving comprises changing from the explorer viewpoint to the ready viewpoint when the character is readied for shooting.

14. A video game as recited in claim 12, wherein the moving comprises changing from the ready viewpoint back to the explorer viewpoint after a specified time delay.

15. A video game as recited in claim 12, wherein the moving comprises smoothly shifting the third-person perspective along a non-linear path between the explorer viewpoint and the ready viewpoint.

16. A video game as recited in claim 12, further comprising computer executable instructions that, when executed by a processor, perform additional acts comprising:
depicting a reticle to assist in aiming at a target; and
causing the character to become translucent when the character at least partially blocks the reticle.

17. A console-based video game system, comprising:
a game console having memory and a processor;
a shooter video game executed on the game console to facilitate combat action during which a player controls at least one character, the character being controlled being one of a squad of plural characters individually selectable for control, wherein one or more of the squad of characters not being directly controlled by a player performs respective player-issued commands by way of an artificial intelligence of the shooter video game, wherein the player-issued commands are determined from a range of possible player-issued commands, the shooter video game being configured to depict action from an explorer viewpoint residing behind and removed from the character being controlled that enables a player to view a greater surrounding area, the shooter video game being further configured to depict one or more player-issued commands by way of a squad status display; and
the shooter video game being further configured to transition from the explorer viewpoint to a ready viewpoint residing behind and near the character being controlled that enables the player to aim at potential targets, the transition occurring in response to an event related to readying the character to shoot, the shooter video game transitioning back to the explorer viewpoint when the character is no longer being readied to shoot and a specified time delay lapses,
wherein the event comprises:
(i) placement of an aiming reticle over a target; or
(ii) movement of the character into a specified combat region.

18. A console-based video game system, comprising:
a game console having memory and a processor;
a shooter video game executed on the game console to facilitate combat action during which a player controls at least one character of a squad of player-selectable characters, wherein at lest one other character of the squad of player-selectable characters not selected for direct player control performs respective player-issued commands by way of an artificial intelligence of the shooter video game, the shooter video game being configured to depict action from an explorer viewpoint residing behind and removed from the character that enables a player to view a greater surrounding area; and
the shooter video game being further configured to transition from the explorer viewpoint to a ready viewpoint residing behind and near the character that enables the player to aim at potential targets, the transition occurring in response to movement of the character into a pre-specified combat region, the shooter video game including a stationary reticle wherein the character is maneuverable relative to the stationary reticle in order to position the stationary reticle on a desired target.

19. A console-based video game system as recited in claim 18, wherein the shooter video game transitions back to the explorer viewpoint when the character is moved out of the pre-specified combat region.

20. A console-based video game system as recited in claim 18, the shooter video game being further configured depict at least one of a squad status display and a radar display corresponding to the squad of player-selectable characters.

21. A method, comprising:
- monitoring for conditions that might arise during play of a third-person shooter video game; and
- based on the conditions, moving a viewing perspective of scenes in the video game between an explorer viewpoint that shows the scenes from a third-person perspective taken behind and remote from a character being controlled and a ready viewpoint that shows the scenes from a third-person perspective taken from behind, but close to, the character; and
- depicting a reticle to assist in aiming at a target, the reticle remaining stationary such that the character being controlled moves relative to the reticle in order to position the reticle on a desired target,
- wherein the explorer viewpoint is a default, and the viewing perspective is moved to the ready viewpoint in response to at least one of the following conditions:
- player-actuation of a controller that is indicative of shooting;
- placement of an aiming reticle over a target; or
- movement of the character into a specified combat region.

* * * * *

UNITED STATES PATENT AND TRADEMARK OFFICE
CERTIFICATE OF CORRECTION

| | | |
|---|---|---|
| PATENT NO. | : 7,470,195 B1 | Page 1 of 1 |
| APPLICATION NO. | : 10/352672 | |
| DATED | : December 30, 2008 | |
| INVENTOR(S) | : William A. Baldwin, III et al. | |

It is certified that error appears in the above-identified patent and that said Letters Patent is hereby corrected as shown below:

In column 9, line 30, in Claim 12, delete "or" and insert -- of --, therefor.

In column 10, line 43, in Claim 18, delete "lest" and insert -- least --, therefor.

In column 10, line 65, in Claim 20, after "configured" insert -- to --.

Signed and Sealed this
Third Day of May, 2011

David J. Kappos
*Director of the United States Patent and Trademark Office*